INVENTOR.
Abraham O. Tidwell

United States Patent Office 3,093,778
Patented June 11, 1963

3,093,778
PHOTOCELL POSITION CONTROL SYSTEM
Abraham O. Tidwell, State College, Pa., assignor to Centre Circuits, Inc., State College, Pa., a corporation of Pennsylvania
Filed Mar. 17, 1961, Ser. No. 96,452
16 Claims. (Cl. 318—31)

This invention relates to the relative positioning of work supports, tools and the like for automatic machining. It relates more particularly to a photocell control for automatically controlling the positioning without physically contacting the part that is moving; in that way there is no appreciable inertia, distortion or cumulative wear problem involved each time the moving part is stopped.

Hitherto, stops, limit switches, and other expedient devices have been employed requiring physical engagement for tripping them so as to stop a moving part such as may constitute a work support, e.g., a milling table. One difficulty is that these stopping devices require adjustment and service because of wear, distortion and the like. Further, there is the disadvantage that rather intricate systems are commonly employed in conjunction therewith in order to give the table a sense of direction as to exactly which way to move so that, based on their sense of position, these stopping devices can then appropriately stop the table.

The present invention employs a companion pair of photocells with a normally balanced electrical output and with an electrically-operated, table positioning device connected in their output. These photocells are effective to supply output current in the right sense and to interrupt the current at the right time for stopping the table, doing so in a simple manner materially overcoming the foregoing disadvantages as will now be more fully explained. Thus, it will be seen that use of two of the present photocells inherently affords an accurate sense of position as they balance in accomplishing the stopping and an equally accurate sense of direction whenever they unbalance one way or another in their infallible manner of always causing movement precisely towards the stopping point.

Further features, objects and advantages will either be specifically pointed out or become apparent when, for a better understanding of the invention, reference is made to the following written description taken in conjunction with the accompanying drawings which form a part hereof and in which.

Figures 1, 2:
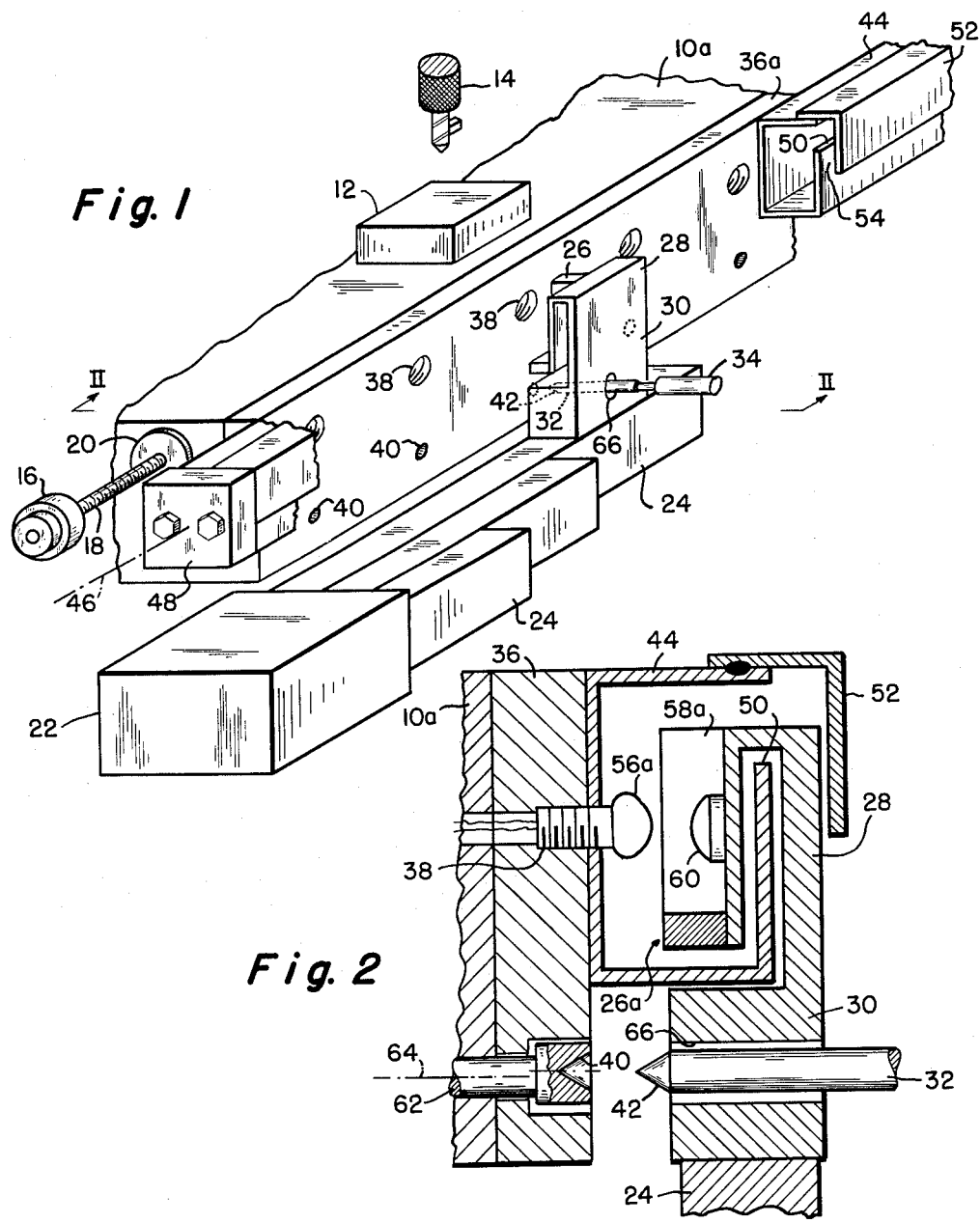
FIGURE 1 is a fragmentary view in perspective of a machine tool embodying the present invention.
FIGURE 2 is a transverse sectional view taken along the section lines II—II of FIGURE 1.

More particularly, in FIGURE 1 of the drawings, the positionable table 10a for a machine tool is shown in association with a workpiece 12 to be machined. The workpiece 12 is supported by the table 10a and, in the case of a milling machine which can serve as an illustrative example, the workpiece 12 will be engaged by the tool carried by a milling head 14 which is adjusted on the machine to operate on different fixed axes of rotation.

The table 10a is a two-axis or a three-axis table as desired but, for purposes of simplified illustration, the table is shown with only one positioning motor 16 for moving it rectilinearly along one path of longitudinal movement. A lead screw 18 rotated by the motor 16 engages a fixed nut or series of nuts 20 carried by the table 10a to cause such movement.

An indexing element 22 operates a group of extending positioning bars 24 for supporting a photocell unit 26 presenting photosensitive surfaces at a station along the path of movement of the table 10a. The positioning bars 24 constitute an accurate gaging mechanism and cooperatively afford a total of one inch of travel so that the station of the unit 26 can be varied to any fractional decimal reading up to one inch. The actual gaging mechanism is fully disclosed in copending Benton and Whitehouse application Serial No. 104,990, filed April 24, 1961, and forms no per se part of the present invention.

A reversely directed mounting member 28 for supporting the unit 26 has a base 30 which is affixed to the adjacent positioning bar 24 and which is arranged to support an indexing plunger 32. The plunger 32 is controlled by a return spring, not shown, and by a single-acting air cylinder 34 which is automatically operated and which is carried by the base 30.

A table connected member 36, or actual portion of the table 10a if desired, carries a first line composed of radiation emitting lamp devices 38 confronting the photocell control unit 26 and another line composed of conical sockets 40 confronting a bevel 42 on the free end of the plunger 32.

By the foregoing means, the table 10a undergoes a positioning sequence as follows. Irrespective of which one of the devices 38 is energized as the source of radiations, it establishes a point of light effective to "find" the station of the photocell control unit 26. Therefore, the motor 16 moves the table 10a to bring the point of light into a transversely aligned position confronting the photocell unit 26 thus establishing a coarse position of transverse alignment. Thereupon the air cylinder 34 is operated forcing the bevel 42 on the plunger to enter and center itself in the appropriate conical socket 40 corresponding in position to the particular radiating device 38. In so doing, the plunger 32 thus physically centers the table 10a from the coarse setting to a fine setting squarely confronting the unit carried by the indexing element 22.

A hood box 44 is carried by the table connected member 36 so that with movement of the table 10a along its longitudinal path, the box moves along its own longitudinal axis 46. The box 44 has closure members, one being indicated at 48, secured at its opposite ends and includes a full length longitudinally extending opening 50 along one side thereof. An impervious canopy member 52 is carried by the box 44 so as to block the opening 50 and form a light trap 54 in cooperation with the adjacent side of the box. The reversely bent member 28 noninterferingly extends through the trap 54 and the opening 50 so as to support the photocell unit 26 within the effective light occluding hood formed by the box 44 and its canopy 52.

In the embodiment of FIGURE 2, the devices 38 consist of individual projecting lamp bulbs 56a and the line of these bulbs 56a is confronted by a division shield 58 on a photocell control unit 26a. The division shield 58a blocks each opposite side portion from exposure to light coming from the other side. Each bulb 56a in the line of devices 38 is substantially vertically aligned with one socket in the line of sockets 40 so that the center-to-center spacing between points in one line is approximately that of the other.

The photosensitive surfaces referred to on the photocell control unit 26a consist of a companion pair of photocells, one of which is indicated at 60 and disposed one on each side of said division shield enabling one to be illuminated by a bulb 56a when the other is in the dark of the shield 58a. In this manner, the light bulb 56a is directional as a light source in its efforts to find the photocell unit 26a because it illuminates and is sensed by only one photosensitive surface initially. When it reaches its coarsely aligned period of transverse alignment with the unit 26a, however, the companion photocells 60 are balanced in illumination so that their outputs match one another.

Each of the conical sockets 40 is formed in the eccentric portion of a rotatable insert 62 supported in the table connected member 36 so as to have a fixed axis 64. Rotation of the insert 60 and subsequent locking thereof by means of locking means, not shown, enables a serviceman to adjust the sockets 40 in establishing an accurate center-to-center position thereof exactly one inch apart. They vary slightly as to their relative level and the plunger 32 is supported in a precisely vertically elongated slot 66 in the base 30 so as to accommodate in a vertical plane as the bevel 42 seats in the socket 40.

Figure 3:
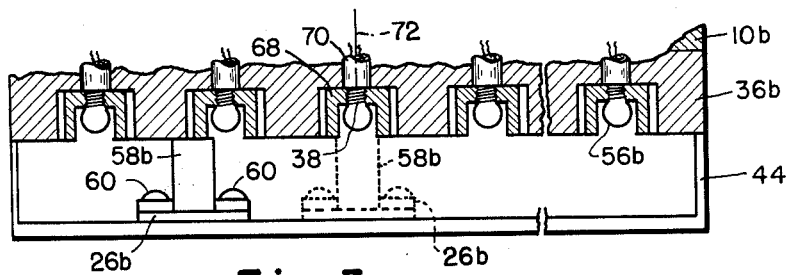
FIGURE 3 is a sectional view in plan showing a modification of the invention applied to the table of FIGURE 1.

In the modified machine tool table 10b of FIGURE 3, the devices 38 carried by the table connected member 36b consist of recessed lamp bulbs 56b. The recesses are defined by eccentric socket portions 68 of a rotatable insert 70 having a fixed longitudinal axis 72. Careful rotation of each insert 70 into an appropriate locked position establishes the center-to-center distances between successive lamp bulbs 56b, preferably one inch apart.

The photocell unit 26b of the indexing element has a wide division shield 58b blocking each side portion from exposure to light reflected down the inside of a hood 44. The width of the shield 58b is approximately the width of each recess of the eccentric members 68, but enough wider in the horizontal sense and enough deeper in the vertical sense to completely cover the recess when squarely transversely aligned therewith. Thus, in the dotted line position shown by the dotted lines for the shield 58b, the companion photocells 60 are completely blocked from light. In this embodiment, the adjustments can be made carefully enough purely by the photocell control; hence, the plunger 32 and cylinder 34 arrangement of the preceding embodiment can be omitted and yet fine settings are readily attained.

Figure 4:
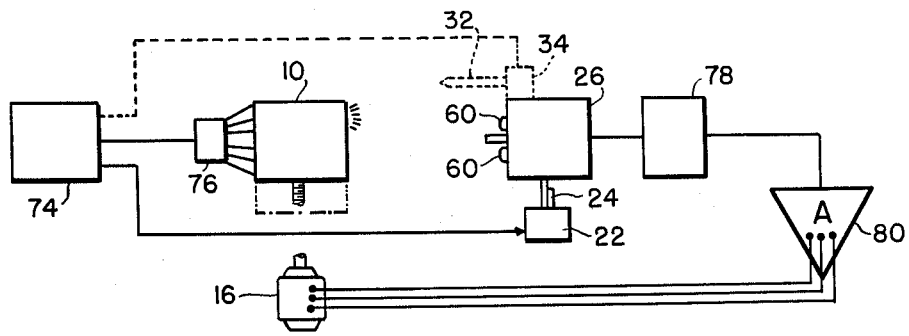
FIGURE 4 is a block diagram of the control apparatus for the machine tool table.

In the block control diagram of FIGURE 4, an automatic control device 74 such as a tape reader operates through a selector 76 containing switches individual to the lamps so as to illuminate a predetermined lamp one at a time at the side of the table 10. If the automatic control device 74 is a tape reader, it can be readily programmed by means of prepunched tape, cards, or the like.

At or prior to the time that a lamp is lit on the table 10, the automatic control device 74 operates through the indexing element 22 to preset the photocell unit 26 of the indexing element at a proper decimal station somewhere between 0.000" and 0.999", provided the reading is to be accurate only to three places. Because one of the photocells 60 is in the dark of a division shield, only the other photocell will be illuminated by a point of light at the side of the table; it finds the indexing element in the following manner.

An electronic filter 78 passes the A.C. light frequency of the point of illumination, from the output of the photocell unit 26 to an amplifier 80 controlling the direction of rotation of a reversible motor 16. The motor 16 moves the table 10 into a reset position shown by the dotted lines, where the point of illumination thereon is transversely aligned with the photocells 60.

Preferably, the selector 76 supplies alternating current at a nonstandard frequency to the selected point of illumination at the side of the table 10 and the filter 78 is adjusted to pass frequencies only in that particular range of frequencies. Thus, stray light falling on the photocells from ambient standard illuminating frequency lamps will have minimal effect in confusing the present control system and, hence, the hood 44 is not an absolute necessity in all cases.

If fine positioning for square transverse alignment is desired to augment the photocell system, a cylinder 34 and indexing plunger 32 arrangement can be provided as shown in dotted lines connected to the automatic control device 74.

Figure 5:
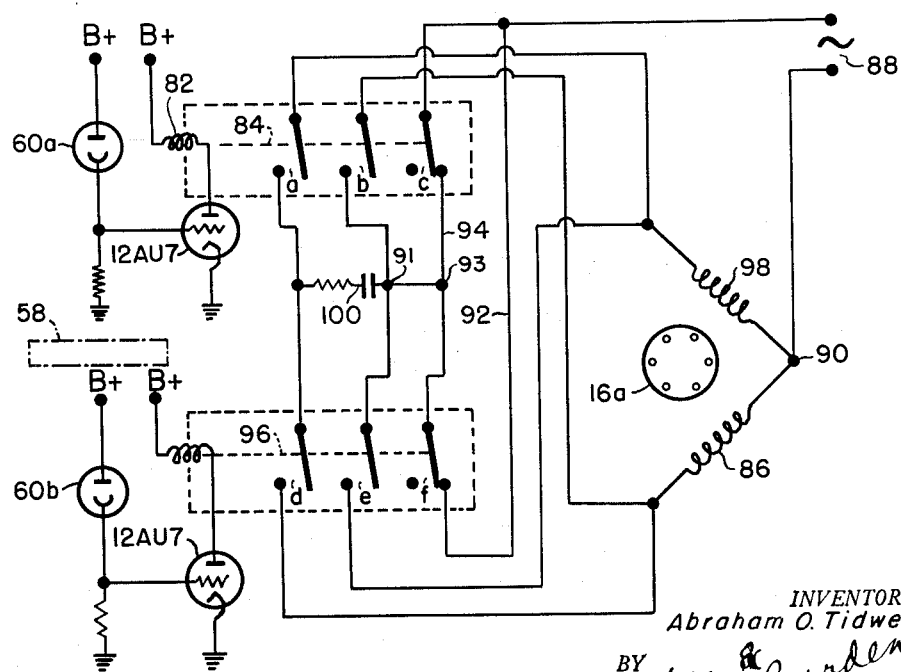
FIGURE 5 is a schematic diagram of a portion of the control circuits for the machine tool table.

In FIGURE 5, a schematic diagram of a suitable control circuit is shown, but with the filter 78 of FIGURE 4 omitted for simplicity. A division shield is indicated by the dotted lines 58 physically between the photocells which are differentiated by subscripts as being photocell 60a and photocell 60b. Each photocell controls the grid of an amplifier device such as a 12AU7 tube.

The relay coil 82 of an electromagnetic switch 84 is included in the plate circuit of one of the amplifier tubes; the time constant of the circuit is such that when the photocell 60a is energized at some A.C. frequency as desired, the upper contacts a, the middle contacts b and the lower contacts c of the switch 84 will close and remain closed under steady pressure. Upon the closure of its middle contacts b, the switch 84 completes a circuit through a phase winding 86 of a reversible A.C. motor 16a so that alternating current flows from a single phase source 88 through a path including a common return terminal 90, the phase winding 86, the middle contacts b of the switch 84, the successive junctions 91 and 93, through the branch 92 of the two parallel branches 92 and 94, and to the source 88. The branch 92 consists of a circuit including and prepared by the lower contacts f of a companion electromagnetic switch 96. Operation of the switch 84 is such as to open the contacts c thus disabling the branch 94.

The upper contacts a of the electromagnetic switch 84 connect a second winding 98 of the motor 16a through a phase shift device 100. The winding 98 therefore electrically leads the in-phase winding 86, with the leading current flow in the former being through the common return terminal 90, through the second winding 98, through the upper switch contacts a, through the phase shift device 100, the successive junctions 91 and 93, through the branch 92 prepared by the lower switch contacts f, and to the source 88. The coil axes of the windings 86 and 98 are physically related at 90° to one another and, with the second winding 98 having the leading phase, rotation of the motor 16a takes a given direction, for example, forward rotation.

When the photocells 60a and 60b are equally illuminated so that the output strength of one matches the other sufficiently for both switches 84 and 96 to be operated, the lowermost contacts c and f thereof open the respective branches 94 and 92 thereby disconnecting the source 88 from the motor 16a so that the motor stops. It will be apparent by analogy from the foregoing description that when the switch 96 only operates, the second winding 98 becomes the in-phase winding and the winding 86 becomes the leading phase winding thus forcing the motor 16a to rotate in the reverse direction. Current is supplied in circuits completed due to closure of the upper and middle contacts d and e of the electromagnetic switch 96.

Figure 6:
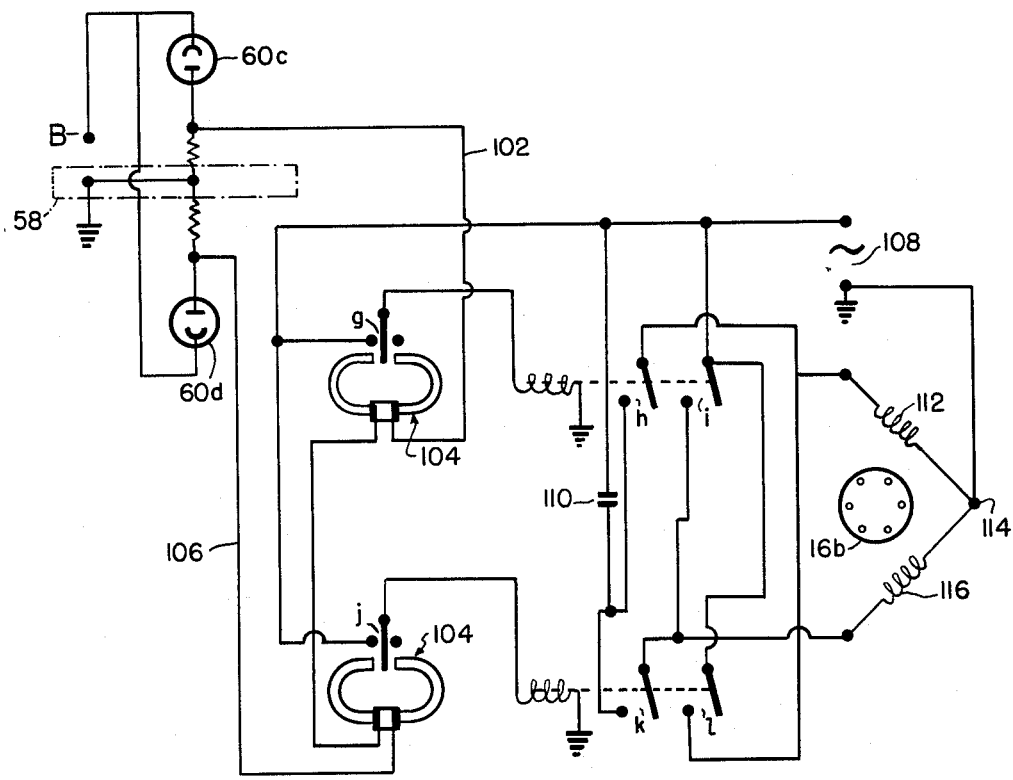
FIGURE 6 is a schematic diagram of a modification of the control circuits for the table.

In FIGURE 6, a schematic diagram of another control circuit is shown, and with the filter 78 of FIGURE 4 again omitted for simplicity. The pair of companion photocells 60c and 60d has a division shield indicated by the dotted lines 58 physically disposed therebetween. A conductor forms a connection 102 between the output of the photocell 60c and one side of a polarized relay 104. A conductor forms another connection 106 between the output of the photocell 60d and the other side of the polarized relay 104.

The upper light contacts g of the polarized relay 104 will close and remain closed when there is an output from the photocell 60c in excess of the output of the photocell 60d. Simultaneously, a heavy set of middle contacts h and lower contacts i will be closed by a solenoid and remain closed whereas the upper control contacts $j$ will be opened; accordingly, a heavy set of middle contacts $k$ and lower contacts $l$ will open and remain opened.

When closure of the control contacts $g$ causes the power contacts $h$ and $i$ to close, current flows from a single phase A.C. source 108 in a path including a phase shift device 110, the middle contacts $h$, the winding 112 of a motor 16$b$ which winding becomes a leading phase winding, a common return terminal 114, and back to the source 108. Simultaneously, current from the source 108 is flowing in a path through the lower contacts $i$, another winding 116 of the motor 16$b$, which winding becomes an in-phase winding, the common return terminal 114, and back to the source 108. Accordingly, the reversible motor 16$b$ undertakes rotation in a given direction, for example, the forward direction.

When the photocell 60$d$ of FIGURE 6 receives illumination in excess of the illumination of the companion photocell 60$c$, the unbalance in output causes the contacts $g$, $h$ and $i$ of the polarized relay 104 to open and causes the contacts $j$, $k$ and $l$ of the relay to close and remain closed. Current accordingly flows in a path from the source 108 through the phase shift device 110, the middle contacts $k$, the winding 116 which becomes a leading phase winding, the common return terminal 114, and back to the source 108. Simultaneously, current flows from the source 108 in a path including the lower contacts $l$, the winding 112 which becomes an in-phase winding, the common return terminal 114, and back to the source 108. Accordingly, the motor 16$b$ runs in the reverse direction.

When the photocells 60$c$ and 60$d$ are equally in the dark or equally illuminated, as the case may be, so as to produce balanced outputs, the polarized relay 104 assumes a neutral position whereupon the contacts $h$, $i$, $k$ and $l$ are released and disconnect the source 108 from the motor 16$b$ which therefore stops.

The polarized relay 104 as shown has two portions in FIGURE 6. It will be understood that the showing is merely schematic and that in practice a single, multiple contact, ultrasensitive polarized relay will be used for the intended purpose. One satisfactory make known by its proprietary name micropositioner is made by Barber-Coleman Company.

It is apparent that the control circuits of FIGURES 5 and 6 can be used with the embodiment of the device shown in FIGURE 2. The embodiment of the control circuit shown in FIGURE 6 is equally well adapted for use with the device shown in FIGURE 3.

As herein disclosed, the invention is shown embodied as the control device for one axis of a two-axis machine tool table; it is evident that for movement on the other axis, the table can be equally well controlled by an identical control device and that, in fact, all three axes of a three-axis table can equally be well controlled using three of the present devices. A common code reader or separate code readers can be provided as appropriate for controlling same. So also the drawing embodies a positioner for the tool table or carriage but self-evidently the positioner can be connected to the tool itself so that the tool moves relative to a work support.

It is also evident that the motor 16 can be designed to be equally responsive to the photocell control if D.C. operation is employed, such as requires a double wound D.C. rotor on the motor; in that event, the motor runs one way or the other dependent on the polarity of direct current impressed on the motor windings. In the broadest sense, the energy selected which emanates from the devices 38 can be sonic or other radiations besides light and can consist, besides, of an electromagnetic field or electrostatic field if desired. In each case, the unit 26 will carry a pair of sensors 60 which can discriminately detect this energy and its direction.

Variations within the spirit and scope of the invention described are equally comprehended by the foregoing description.

I claim:
1. The combination with a fixed and relatively movable element, of drive means for applying power to position the movable element relative to said fixed element, one of said elements carrying a plurality of radiation emitting devices at equally spaced apart points therealong, the other element comprising an operable indexing element connected for stopping said drive means and having operating means therefor including a radiation sensor unit which with respect to any energized one of said devices senses a satisfied position of transverse alignment therewith, and means for energizing a selected one of said devices causing it to emit radiations.

2. The combination with a fixed and relatively movable element, of reversible drive means for applying power to position the movable element relative to said fixed element, one of said elements carrying a plurality of radiation emitting lamp devices at equally spaced apart points therealong and the other comprising an indexing element connected for stopping said drive means and having a photocell control unit which with respect to each radiation emitting device has a satisfied position of transverse alignment therewith, a selector, and switching members operable by said selector and provided individual to and of a number corresponding with said radiation emitting devices for discriminately supplying energizing current to and flow to only one of said devices at a time enabling it and the indexing element to seek their position of transverse alignment aforesaid without interfering radiation from the other devices.

3. The combination with a fixed and relatively movable element, of reversible drive means for applying power to position the movable element relative to said fixed element, one of said elements carrying a plurality of radiation emitting lamp devices at equally spaced apart points therealong and the other comprising an indexing element connected for stopping said drive means and having mounting means mounting a photocell control unit which with respect to each radiation emitting device has a satisfied position of transverse alignment therewith, a box mounted to said one element and surrounding said devices and said photocell unit so as to form an enclosing hood, said box having a longitudinally extending opening along one side and carrying an impervious canopy member occluding said opening so as to define with the adjacent side of said box a reversely directed light trap, said mounting means comprising a reversely directed member extending through said trap so as to noninterferingly support said photocell unit, and means operated by said photocell unit and connected for stopping said drive means when the relative position of transverse alignment aforesaid is reached between said photocell control unit and a device which is emitting radiations.

4. The combination with a fixed and a relatively movable element, of follow-up mechanism for applying power to position the relatively movable element with respect to the fixed element, one of said elements having selectable points therealong effective for emitting radiations and the other comprising an indexing element which with respect to each selected radiation emitting point has a satisfied position of transverse alignment therewith, said follow-up mechanism including a pair of balanced photocells in the input of said follow-up mechanism and mounted to face in opposite directions on said indexing element so as to determine the proper sense of operation of said follow-up mechanism for moving said selected point in the direction of the indexing element whereby said satisfied position of transverse alignment is established, thus bringing said photocells into rebalance with one another.

5. Follow-up means for use in relatively positioning a table connected element with respect to a fixed element, including reversible drive means comprising a pair of windings for causing relative longitudinal motion between said elements, an electrical amplifier device for operating said windings, one of said elements having selectable points therealong each effective for emitting radiations and the other element comprising an indexing element which with respect to each selected point of radiation has a satisfied position of transverse alignment therewith, means comprising a sensor unit on said indexing element for operating said amplifier device in response to the sense of longitudinal displacement of a selected one of said emission points from the desired transversely aligned position thereof with respect to said indexing element, and means connecting said reversible drive means and said amplifier device whereby the latter selectively operates said windings for relatively moving said selected emission point and the indexing element into their satisfied position of transverse alignment.

6. Follow-up means for use in relatively positioning a table connected element and a fixed element with respect to one another, including reversible drive means comprising a pair of windings for causing relative longitudinal motion between said elements, an electrical amplifier device for operating said windings, one of said elements having plural lamps fixed at equally spaced apart points therealong for selectively emitting light and the other of said elements comprising an indexing element which with respect to each selected point of light has a satisfied position of transverse alignment therewith, means connected for operating said amplifier device comprising a pair of photocells mounted to said indexing element to face in opposite directions for unequally receiving said light and introducing unequal respective outputs to the amplifier device, and means connecting said reversible drive means and said amplifier device whereby the latter selectively operates said windings to relatively move said selected light point and the indexing element into their satisfied position of transverse alignment whereby the outputs of the respective photocells to the amplifier device equalize.

7. Follow-up means for use in relatively positioning a table connected element and a fixed element with respect to one another, including reversible drive means comprising a pair of windings for causing relative longitudinal movement between said elements, an electrical amplifier device operating said windings, one of said elements having a number of energizable lamps fixed at an equally spaced apart line of points therealong and the other of said elements comprising an indexing element which with respect to each energized lamp point has a satisfied position of transverse alignment therewith, a pair of photocells mounted to said indexing element to face in opposite directions with respect to said line of points for unequally receiving light and introducing unequal respective outputs to the amplifier device, means connecting said reversible drive means and said amplifier device whereby the latter selectively operates said windings to drive said lamps so that each operatively reaches a satisfied position of transverse alignment with the indexing element, a lamp selector, and switching members individual to and of a number corresponding with said lamps and operable by the selector to energize only one lamp at a time so that in reaching its position of transverse alignment with the indexing element the lamp will cause the outputs of said photocells to equalize.

8. In a table control apparatus for positioning the table in a longitudinal path of movement, the combination comprising an electrical indexing element having a preset position along said path of movement and having oppositely disposed photocells capable when balanced under equal light to produce matching electrical outputs, reversible drive means operative from the output of said indexing element to move said table bidirectionally, table connected lamp means movable with the table and energizable as a light source from either direction with respect to said photocells for activating the photocell disposed in that direction, and means connecting the reversible drive means in the output of said photocells and responsive to the sense of unbalance therebetween to cause the table to move the light source to an equidistant point between and confronting said photocells.

9. In table control apparatus for positioning a table in a longitudinal path of movement, the combination comprising an electrical indexing element having a preset position along said path of movement, and having oppositely disposed photocells capable when balanced under an equal magnitude of light to produce matching electrical outputs, reversible drive means operative from the output of the photocells of said electrical indexing element to move said table bidirectionally, a table connected element carrying an elongated hood in surrounding relation to the photocells of said indexing element and movable on a longitudinal axis with respect thereto, a division shield on said indexing element in a position between said photocells so that each photocell is directive to light from an opposite direction from the other within said hood, said table connected element carrying lamp means within the hood and energizable as a light source from either direction with respect to said photocells for activating the photocell directed in that direction, means connecting the reversible drive means in the output of said photocells and responsive to the sense of unbalance therebetween for causing the table connected element to move the selected light source to a point equidistant to and confronting said photocells causing their output to rebalance with one another.

10. In table control apparatus for positioning a table in a longitudinal path of movement, the combination comprising an electrical indexing element having a preset position along said path of movement and having oppositely disposed photocells capable when balanced under equal light to produce matching electrical outputs, reversible drive means operative from the output of the photocells of said electrical indexing element to move said table bidirectionally, means comprising table connected lamp means energizable as a light source from either direction with respect to said photocells for activating the photocell disposed in that direction, said photocells having a division shield therebetween on said indexing element to shield each photocell from light coming in a longitudinal direction toward the other photocell, and means connecting the reversible drive means in the output of said photocells and responsive to the sense of unbalance therebetween for causing said table to move the light source into a position confronting said division shield enabling the output from the respective photocells to be rematched.

11. In table control apparatus for positioning a table in a longitudinal path of movement, the combination comprising an indexing element having a preset position along said path of movement and having oppositely disposed photocells capable when balanced under equal light to produce matching electrical outputs, reversible drive means operative from the output of the photocells of said indexing element to move said table bidirectionally, means comprising table connected lamp means energizable as a light source from either direction with respect to said photocells for activating the photocell disposed in that direction, an indexing plunger carried by said indexing element and operative to make transverse engagement with means on said table connected element having equally spaced apart relation corresponding to said lamps, means connecting the reversible drive means in the output of said photocells and responsive to the sense of unbalance therebetween for causing the table to move the light source to a position substantially confronting said photocells and indexing plunger, and means operative to cause said indexing plunger to make transverse engagement with a means aforesaid on said table connected element corresponding in position thereon to the lamp forming the light source.

12. In table control apparatus for positioning a table in a longitudinal path of movement, the combination comprising an indexing element having a preset position along said path of movement and having oppositely disposed photocells capable when balanced under equal light to produce matching electrical outputs, reversible drive means operative from the output of the photocells of said indexing element to move said table bidirectionally, means comprising recessed lamp means in the table energizable as a light source from either direction with respect to said photocells for activating the photocell disposed in that direction, said photocells having a shield which is of a width at least equal to the effective width of the lamp recesses so as to occlude the lamp means from both photocells when transversely aligned therewith, and means connecting the reversible drive means in the output of said photocells and responsive to the sense of unbalance therebetween for causing the table to move said light source so as to establish the transverse alignment between lamp recess and both photocells as aforesaid.

13. For use with a carriage driven by a switch-deenergized drive means and having a light on the side of the carriage moving therewith, carriage stopping mechanism operative, when said light passes in transverse alignment thereby, for tripping the deenergizing switch to stop said drive means and comprising, in combination, an indexing element, a division shield thereon blocking each side portion of the indexing element from exposure to light coming from the other side, photosensitive surfaces on said element disposed one on each side of said division shield and effective when balanced under equal light confronting same to have matching outputs, and means connecting said carriage stopping mechanism in the output of said photosensitive surfaces to operate said stopping mechanism in response to the output of each photosensitive surface being brought to a matching value to the output of the other.

14. Carriage stopping mechanism according to the combination of claim 13 wherein said division shield is of sufficient width compared to the light on the side of said carriage so as to establish cooperation with means surrounding the light on the carriage to completely occlude the light when said photosensitive surfaces confront said light.

15. Method of position selection and control for a system comprising first and second relatively movable linear elements and means to effect such movement, said first element comprising a series of linearly disposed, selectively energized light sources, said second element comprising a pair of sensing photo cells arranged with a light shield therebetween, said method consisting of the steps comprising: selectively energizing one of said light sources to select a desired position; discriminately exposing said photocells to the light therefrom with only one receiving illumination and the other photocell being shielded; and so controlling said means to effect movement in response to said photocell illumination as to bring said photocells into a position of balanced illumination with respect to said selectively energized light source.

16. Method of position selection and control for a system comprising first and second relatively movable linear elements and means to effect such movement; said first element comprising a series of linearly disposed, selectively energized light sources; said second element comprising a pair of sensing photo cells arranged with a light shield therebetween; and filtering means having a passband different from standard ambient illuminating frequency and coupling the individual outputs of said photocells to said means to effect movement so that each photocell when activated operates said means in a different direction from the other; said method consisting of steps comprising: providing illumination power at a nonstandard frequency within the passband frequency of said filter, selectively energizing one of said light sources at said nonstandard frequency to select a desired position, discriminately exposing said photocells to the light therefrom with only one receiving illumination and the other photocell being shielded, and so controlling said means to effect movement in response to said photocell illumination as to bring said photocells into a position of balanced illumination with respect to said selectively energized light source, whereby the quantity of nonstandard frequency illumination, if any, reaching one photocell reaches the other in substantially equal amount.

References Cited in the file of this patent

R. Kretz Mann: Industrial Electronics Handbook, Phillips Technical Library, 1958; pages 86, 87.

Cockrell, W. D.: Industrial Electronic Control, first edition, McGraw-Hill, New York, 1944; page 159, FIG. 13.

Cage, J. M. Bashe, C. J.: Theory and Application of Industrial Electronics, McGraw-Hill, New York, 1951; page 242, FIGS. 12-35.